Oct. 5, 1926.

E. J. JONSSENS 1,602,025

AUTOMOBILE RIM

Filed Oct. 18, 1923

INVENTOR.
EDWARD J. JONSSENS
BY
B. J. Craig
ATTORNEY.

Patented Oct. 5, 1926.

1,602,025

UNITED STATES PATENT OFFICE.

EDWARD J. JONSSENS, OF HOLLYWOOD, CALIFORNIA, ASSIGNOR, BY DIRECT AND MESNE ASSIGNMENTS, TO EDWARD J. JONSSENS, ALEXANDER McL. FRANKLIN, AND JAMES G. TAIT, TRUSTEES FOR "THE SIMPLY QUICK RIM COMPANY."

AUTOMOBILE RIM.

Application filed October 18, 1923. Serial No. 669,293.

This invention relates to rims for the wheels of vehicles.

The general object of the invention is to provide an improved rim for use on vehicles, such as automobiles, wherein the rim is so constructed that a tire secured thereon may be readily removed and replaced.

One of the objects of the invention is to provide an automobile rim comprising two annular members having a circumferential joint and provided with locking portions for holding the parts of the rim together.

Another object of the invention is to provide an automobile rim comprising a plurality of parts united by a joint including stepped portions and having associated therewith a locking band for holding the parts of the rim in place.

An additional object of the invention is to provide a split rim for automobiles including two annular portions having engaging portions thereon and having associated therewith a locking band comprising a member having means thereon for coacting with the engaging portions.

Figures 1, 3:
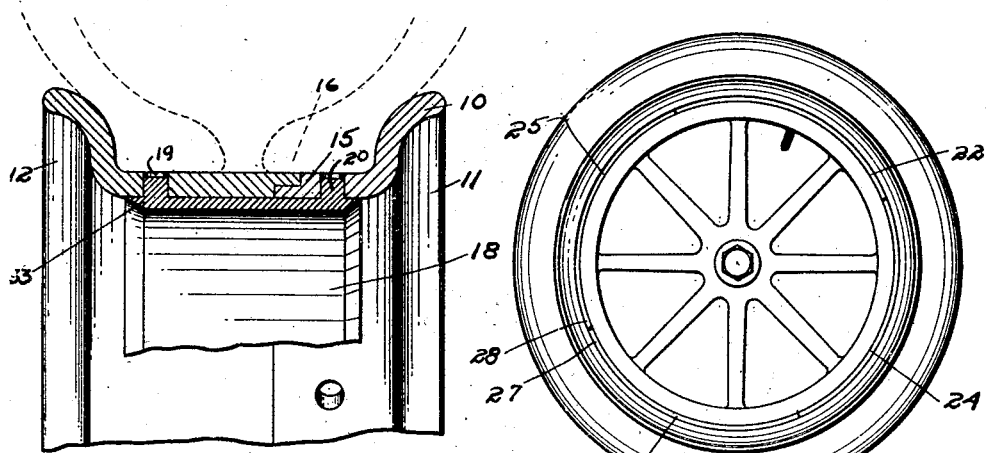
Figure 4:
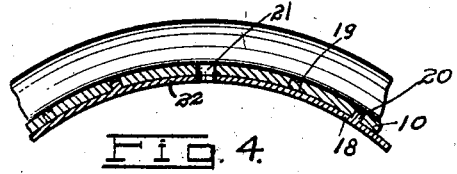
Figure 5:
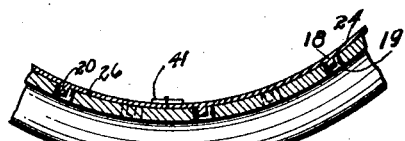
Figure 6:
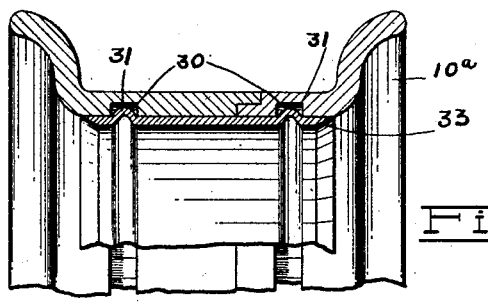
Figure 2:
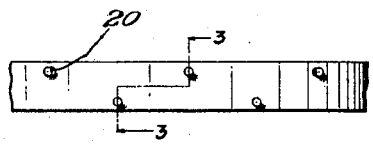
Figure 7:
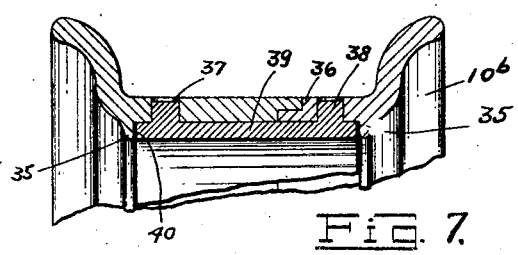

Other objects of the invention will be apparent from the following description taken in connection with the accompanying drawings wherein Fig. 1 is an elevation of an automobile wheel equipped with a rim embodying the features of my invention; Fig. 2 is a fragmentary development showing the locking band; Fig. 3 is a section of an assembled rim corresponding to the line 3—3, Fig. 2; Fig. 4 is a fragmentary section showing a portion of the automobile rim; Fig. 5 is a view similar to Fig. 4 showing a modification wherein two sections are hinged; Fig. 6 is a fragmentary section of a rim showing a modified form of my invention and Fig. 7 is a view similar to Fig. 6 showing a further modification.

Referring to the drawing by reference characters, I have shown a rim at 10 which is of the character adapted for use on automobiles. This rim comprises two parts 11 and 12, which are indicated as separated by a stepped joint 15. The stepped joint 15 provides a smooth outer surface for engagement with the bead 16 of an automobile tire and also prevents any shearing action between the parts of the rim.

In order to hold the parts of the rim together I show means comprising a locking band 18. The rim is shown as provided with a plurality of apertures 19 arranged in staggered relation therearound, and on each side of the rim. The locking band is shown as provided with lugs 20 which are adapted to fit in the apertures 19.

An aperture 21 for a tire valve is provided in both the locking band and the rim. As shown in Fig. 1 the locking band preferably comprises a plurality of parts. In the drawing I have shown the band as comprising four parts although any other number of parts may be employed if desired. In the part 22 of the locking band, shown in Fig. 4, which is the part adjacent the valve aperture 21 it will be noted that the apertures 19 and the lugs 20 are of substantially the same dimensions so that there will be no sliding movement between the rim 10 and the locking band. This arrangement is to prevent shearing the valve stem. In the other parts of the locking band 24, 25, and 26, Fig. 1, I preferably make the apertures 19 of larger dimensions than the lugs 20, also shown in Fig. 5, so that in assembling the rim the locking band may be slid along circumferentially.

In assembling a rim wherein all of the parts of the locking band are disconnected the part 22 is first inserted after which the parts 24 and 25 are placed on the rim and moved to position. The part 26 is then inserted and this part is forced along until the ends 27 and 28 of the parts 26 and 25 are adjacent to each other so that they may be moved down against the inner portion of the rim.

In Fig. 6 I show a slight modification of my invention wherein each part of the rim 10ª is provided with an inner circumferentially extending groove 30. The locking band is provided with ribs 31 which are adapted to fit in the grooves 30. In this modification of my invention I may make the locking band of one strip of metal bent to a circle and having the joint disposed so that it will be diametrically opposite the tire valve. I prefer, however, to make the locking band of a plurality of parts. In both the arrangements previously described the outer edges 33 of the locking band may be provided with beveled portions as indicated.

Referring to Fig. 7 I here show a rim 10^b which is provided with a peripheral bead 35 arranged adjacent each edge thereof. As shown in Fig. 7 the rim is provided with a stepped joint 36 and with apertures 37 which coact with lugs 38 on the locking band 39. In this modification, I prefer to make the surface 40 of the locking band which is adjacent to each bead 35 at right angles to the body portion of the band. The thickness of metal of the locking band may be substantially the same as the height of the beads 35 so that the inner surface of the locking band will be flush with the inner surface of the beads 35.

In Fig. 5 it will be noted that I show the locking band 18 as provided with a hinge 41 uniting the parts 24 and 26. The hinged joint is in some cases desirable as its use reduces the number of parts which go to make up the locking band.

From the foregoing description it will be apparent that I have provided an improved form of vehicle rim which can be economically constructed and which will allow a tire to be quickly and easily placed on and removed from the rim and wherein the construction is such that the strength of the rim is unimpaired and the manufacturing costs are but slightly increased.

Having thus described my invention, I claim:—

1. An automobile rim comprising two parts, a locking band for uniting said parts, said rim having spaced apertures therein and said locking band having lugs thereon coacting with said apertures, said rim having an aperture therein to receive a tire valve, said locking band comprising a plurality of parts, one of said parts terminating on each side of said valve aperture, the lugs and apertures in said part adjacent said valve aperture having substantially the same dimensions whereby they will not move relative to each other, the other parts of said locking band having lugs which are of smaller dimension than their coacting apertures whereby the said other parts of the band may slide when they are being placed in position and being removed.

2. An automobile rim comprising two parts united by a flush joint, a sectional locking band fitted in said rim for uniting said parts, said rim having a bead near each side thereof, said band being fitted between said beads, said locking band and said rim parts being provided with cooperating interengaging lugs and apertures, a plurality of parts of said locking band being hingedly connected together, said interengaging lugs and apertures being of such relative size that certain parts of the locking band may be slid along the rim while the parts are being assembled.

In testimony whereof, I hereunto affix my signature.

EDWARD J. JONSSENS.